E. WELLS, A. E. RICHARDSON, W. J. VAN PATTEN & H. WELLS.
Refining and Packing Catechu.
No. 210,280. Patented Nov. 26, 1878.
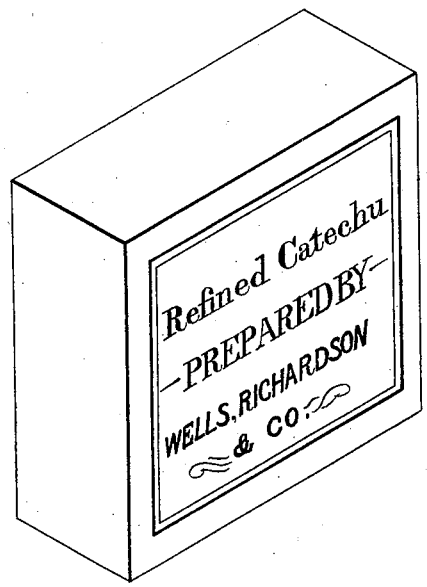

UNITED STATES PATENT OFFICE.

EDWARD WELLS, ALBERT E. RICHARDSON, WILLIAM J. VAN PATTEN, AND HENRY WELLS, OF BURLINGTON, VERMONT.

IMPROVEMENT IN REFINING AND PACKING CATECHU.

Specification forming part of Letters Patent No. 210,280, dated November 26, 1878; application filed May 10, 1878.

*To all whom it may concern:*

Be it known that we, EDWARD WELLS, ALBERT E. RICHARDSON, WILLIAM J. VAN PATTEN, and HENRY WELLS, all of Burlington, in the county of Chittenden and State of Vermont, have invented certain new and useful Improvements in Processes of Refining and Putting Up Catechu; and we do hereby declare that the following is a full, clear, and exact description thereof, which will enable others skilled in the art to which it appertains to make and use the same, reference being had to the accompanying drawing, and to letters of reference marked thereon, which form a part of this specification.

The object of this invention is to remove the impurities from catechu and put it into small packages suited to the wants of the consumer and the trade; and the invention will be hereinafter fully set forth, and pointed out in the claims.

The drawing shows a package of the refined catechu in the rectangular shape, which we prefer, as being the most convenient for use.

In carrying out our invention we take either variety of catechu, designated as *Catechu nigrum* or *Catechu pallidum*, and known in commerce by the names of cutch, gambir, or *Terra Japonica*, and having removed the mats which envelop it we divide it into pieces of a convenient size to handle. It is then placed in a steam-jacketed kettle containing a sufficient quantity of water, and heated until liquefied. During the process of liquefaction we introduce into the contents of the kettle steam of high temperature, to assist in the process, and also to cause the lighter impurities, such as pieces of rushes and leaves, to more readily rise to the surface, that they may be removed by the skimmer. When thoroughly liquefied and of the proper consistence it is put through a strainer made of wire-cloth, which removes all sticks and stones and coarse impurities. It is then kept in a liquid state and at rest until the earthy impurities settle to the bottom, when it may be drawn off, while still hot and in liquid form, into boxes of such size and shape and material as may be desirable, usually, however, containing one-fourth pound, one-half pound, and one pound each.

The boxes we prefer to make of pasteboard or paper, of the rectangular form shown in the drawing, so that they shall be capable of forming a compact mass, completely filling the cases in which they are packed for transportation.

The crude catechu purified by steam and placed in boxes in the manner described is much stronger and better for the various purposes to which it is applied, as well as much more convenient for the users and dealers in the article.

We are aware that steam-heat has heretofore been employed in the melting and purification of wax, gums, &c., and we therefore do not claim merely the use of steam.

Having thus described our invention, we claim as new, and desire to secure by Letters Patent, the following:

1. The process of refining and packing catechu herein described, which consists in first placing the catechu in a vessel containing a sufficient quantity of water, then subjecting it to the action of steam-heat, at the same time introducing into the mass steam of a high temperature, thereby liquefying the catechu and forcing the lighter substances to the surface, then skimming, straining, and settling, and finally placing the catechu, while still liquid, in boxes holding certain specified quantities, as herein set forth.

2. The herein-described article of manufacture, consisting of refined and concentrated catechu, incased in a tight integument or envelope, as and for the purpose specified.

In testimony that we claim the foregoing as our own we hereunto affix our signatures in presence of two witnesses.

EDWARD WELLS.
    A. E. RICHARDSON.
    W. J. VAN PATTEN.
    HENRY WELLS.

Witnesses:
 A. B. COGSWELL,
 ISAAC STERNS.